(12) United States Patent
Murakami et al.

(10) Patent No.: US 8,508,473 B2
(45) Date of Patent: Aug. 13, 2013

(54) INFORMATION PROCESSING DEVICE

(75) Inventors: Keiichi Murakami, Ichikawa (JP); Noriko Ooi, Tokyo (JP); Kentaro Endo, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 638 days.

(21) Appl. No.: 12/329,877

(22) Filed: Dec. 8, 2008

(65) Prior Publication Data

US 2009/0153489 A1 Jun. 18, 2009

(30) Foreign Application Priority Data

Dec. 14, 2007 (JP) .............................. P2007-323705

(51) Int. Cl.
*G06F 3/033* (2006.01)

(52) U.S. Cl.
USPC ........................... 345/157; 345/168; 345/173

(58) Field of Classification Search
USPC ................................................ 345/157–173
See application file for complete search history.

(56) References Cited

U.S. PATENT DOCUMENTS

| | | | | |
|---|---|---|---|---|
| 6,476,797 | B1 * | 11/2002 | Kurihara et al. | 345/173 |
| 7,010,333 | B2 * | 3/2006 | Trively | 455/575.3 |
| 2002/0049070 | A1 * | 4/2002 | Bick | 455/550 |
| 2003/0030628 | A1 * | 2/2003 | Sato et al. | 345/173 |
| 2004/0239649 | A1 * | 12/2004 | Ludtke | 345/173 |
| 2007/0035419 | A1 | 2/2007 | Wang et al. | |
| 2007/0152982 | A1 * | 7/2007 | Kim et al. | 345/173 |
| 2007/0152983 | A1 * | 7/2007 | McKillop et al. | 345/173 |

FOREIGN PATENT DOCUMENTS

| | | |
|---|---|---|
| CN | 2574121 Y | 9/2003 |
| EP | 1286 250 A2 | 2/2003 |
| GB | 2 402 105 A | 12/2004 |
| JP | 2002-351606 | 12/2002 |
| JP | 2006-42123 | 2/2006 |
| JP | 2007-52643 | 3/2007 |

OTHER PUBLICATIONS

Office Action issued Feb. 17, 2011, in Chinese Patent Application No. 200810186992.6 (with English-language Translation).
Japanese Office Action issued Aug. 9, 2011, in Patent Application No. 2007-323705 (with English-language translation).
Office Action issued in Chinese Patent Application No. 200810186992.6 on Feb. 13, 2012.

* cited by examiner

*Primary Examiner* — Christopher E Leiby
(74) *Attorney, Agent, or Firm* — Oblon, Spivak, McClelland, Maier & Neustadt, L.L.P.

(57) ABSTRACT

An object of the present invention is to provide an information processing device which is capable of suitably switching between hardware buttons and an electrostatic pad such as a touch panel, depending on the operating circumstances of a user. In a cellular phone, judgment is made as to an application, which is an operation target for the user, and, in accordance with the application judged, an input device control section is able to switch between accepting inputs from an electrostatic pad input acceptance section and accepting inputs from a hardware button input acceptance section, depending on the application thus judged by a CPU.

5 Claims, 12 Drawing Sheets

Fig.3
(a)
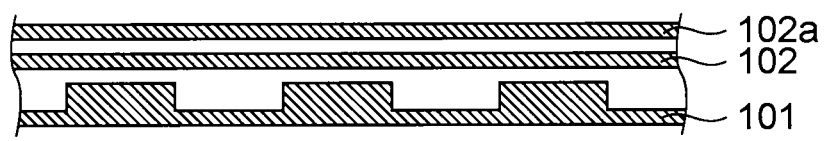
(b)
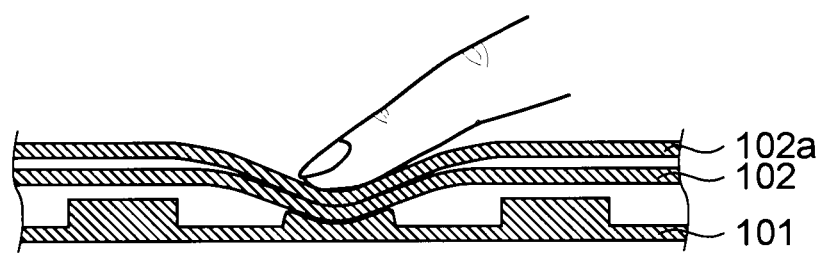

Fig.5

| NAME OF APPLICATION | ELECTROSTATIC PAD |
|---|---|
| FULL BROWSER | ON |
| NOTEBOOK | OFF |

*Fig.12*
(a)
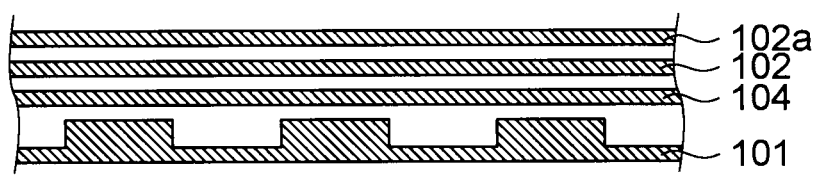
(b)
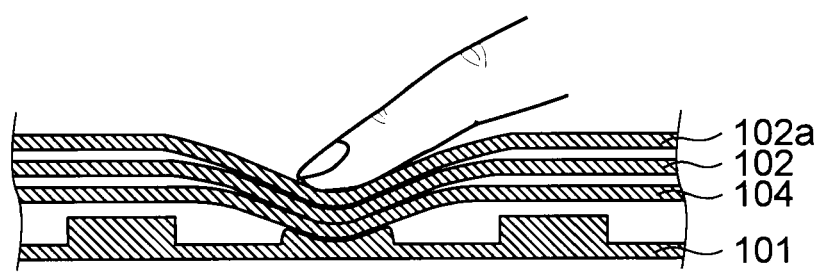

INFORMATION PROCESSING DEVICE

BACKGROUND OF THE INVENTION

1. Field of the Invention

The present invention relates to an information processing device which operates an application.

2. Related Background Art

Products which have a user interface which utilizes an electrostatic pad or a touch panel installed in a cellular phone have been on the increase. For example, a cellular phone comprising a touch panel is disclosed in Japanese Patent Application Laid Open No. 2006-42123.

SUMMARY OF THE INVENTION

However, a touch panel is sometimes difficult to operate in comparison with hardware (HW) buttons which comprise key tops or the like and allow instructions to be issued through electrical contact by pressing the key tops. For example, in cases where character inputting is performed by pressing the same point on a touch panel (equivalent to a key top of a hardware button) a plurality of times, there can be various input methods such as the user continuously pressing the same button at short intervals or pressing the same button without removing his finger from the button. In this case, there is the problem that the touch panel is unable to accurately recognize the number of times the touch panel is pressed by the user and that characters which differ from the characters intended by the user are input.

Therefore, in order to solve the above problem, an object of the present invention is to provide an information processing device which is capable of suitably switching between hardware buttons and an electrostatic pad such as a touch panel, depending on the operating circumstances of the user.

In order to solve the above problem, the information processing device of the present invention comprises: an electrostatic pad which accepts inputs from a user; hardware buttons which are disposed to be stacked below the electrostatic pad and accept inputs from the user; judgment means for judging an application which constitutes a user operation target; and switching means for switching between accepting inputs from the electrostatic pad and accepting inputs from the hardware buttons, depending on the application judged by the judgment means.

The present invention is capable of judging an application which constitutes a user operation target and of switching between accepting inputs from the electrostatic pad and accepting inputs from the hardware buttons, depending on the application thus judged. Accordingly, it is possible to provide a user-friendly device in which hardware buttons and an electrostatic pad are disposed to be stacked and which is capable of suitably and automatically switching between the hardware buttons and the electrostatic pad depending on the usage state thereof, without the user manually switching between operating the hardware buttons and the electrostatic pad.

Furthermore, the information processing device of the present invention further comprises display means for displaying an operation screen on which a pointer can be operated by means of the inputs accepted by the electrostatic pad; and detection means for detecting that the pointer, which is operated by means of the electrostatic pad, is pointing to a predetermined object among objects which are displayed on the operation screen displayed by the display means, wherein, in cases where the predetermined object is detected by the detection means, the switching means preferably switches the electrostatic pad to an OFF state in which inputs from the electrostatic pad are not accepted and switches the hardware buttons to an ON state in which inputs from the hardware buttons are accepted.

The present invention is capable of detecting that a pointer, which is operated by means of the electrostatic pad, is pointing to a predetermined object among objects which are displayed on the displayed operation screen and, in cases where the predetermined object is detected, is capable of switching the electrostatic pad to an OFF state and the hardware buttons to an ON state. Accordingly, it is possible to provide a user-friendly device which is capable of switching its input from the electrostatic pad to the hardware buttons depending on the object.

In addition, the display means of the information processing device of the present invention preferably produces a display indicating whether the electrostatic pad or the hardware buttons are in an ON state.

The present invention allows the user to easily grasp whether he may use either the electrostatic pad or the hardware buttons by displaying whether the electrostatic pad or the hardware buttons is in an ON state.

Furthermore, in the information processing device of the present invention, the electrostatic pad and the hardware buttons are preferably constituted by transparent members and the display means is preferably disposed to be stacked below the electrostatic pad and the hardware buttons.

The present invention allows the device constitution to be reduced by disposing the display means stacked below the electrostatic pad and the hardware buttons which are constituted by transparent members.

The present invention makes it possible to provide a user-friendly device which is capable of suitably and automatically switching between the hardware buttons and the electrostatic pad depending on the usage state thereof, without the user manually switching between operating the hardware buttons and the electrostatic pad.

BRIEF DESCRIPTION OF THE DRAWINGS

FIG. 3 is a cross-sectional view in the direction of arrow III-III in the schematic constitutional view;

FIG. 5 is an explanatory diagram of a data table 108 of this embodiment;

FIG. 12 is a cross-sectional view in the direction of the arrow XII-XII in the schematic view of the modified example.

DESCRIPTION OF THE PREFERRED EMBODIMENTS

Figure 1:
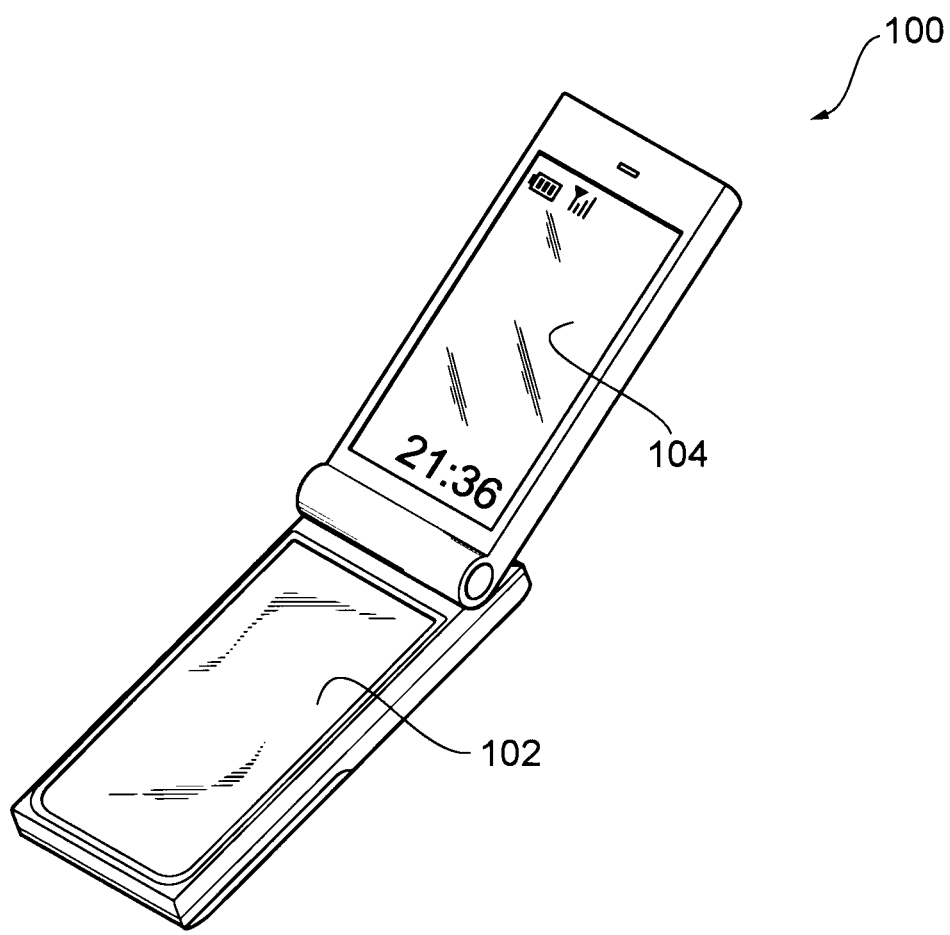
FIG. 1 is a perspective view of a schematic constitutional view of a cellular phone 100 of this embodiment.

The present invention can be easily grasped by considering the following detailed description with reference to the attached drawings displayed for an embodiment. Subsequently, embodiments of the present invention will be described while making reference to the attached drawings. Wherever possible, the same reference numerals are assigned to the same parts and repetitive description is avoided.

FIG. 1 is a perspective view of a schematic constitutional view of the cellular phone 100 which is the information processing device of this embodiment. As shown in FIG. 1, the cellular phone 100 comprises the electrostatic pad input acceptance section 102 and the screen display section 104. The hardware button input acceptance section 101 is disposed below the electrostatic pad input acceptance section 102. The electrostatic pad input acceptance section 102 is formed by an elastic and transparent member and the user is able to perform an input operation with respect to the electrostatic pad input acceptance section 102 and is able to perform an input operation via the elastic electrostatic pad input acceptance section 102 with respect to the hardware button input acceptance section 101 which is disposed below the electrostatic pad input acceptance section 102.

Figure 2:
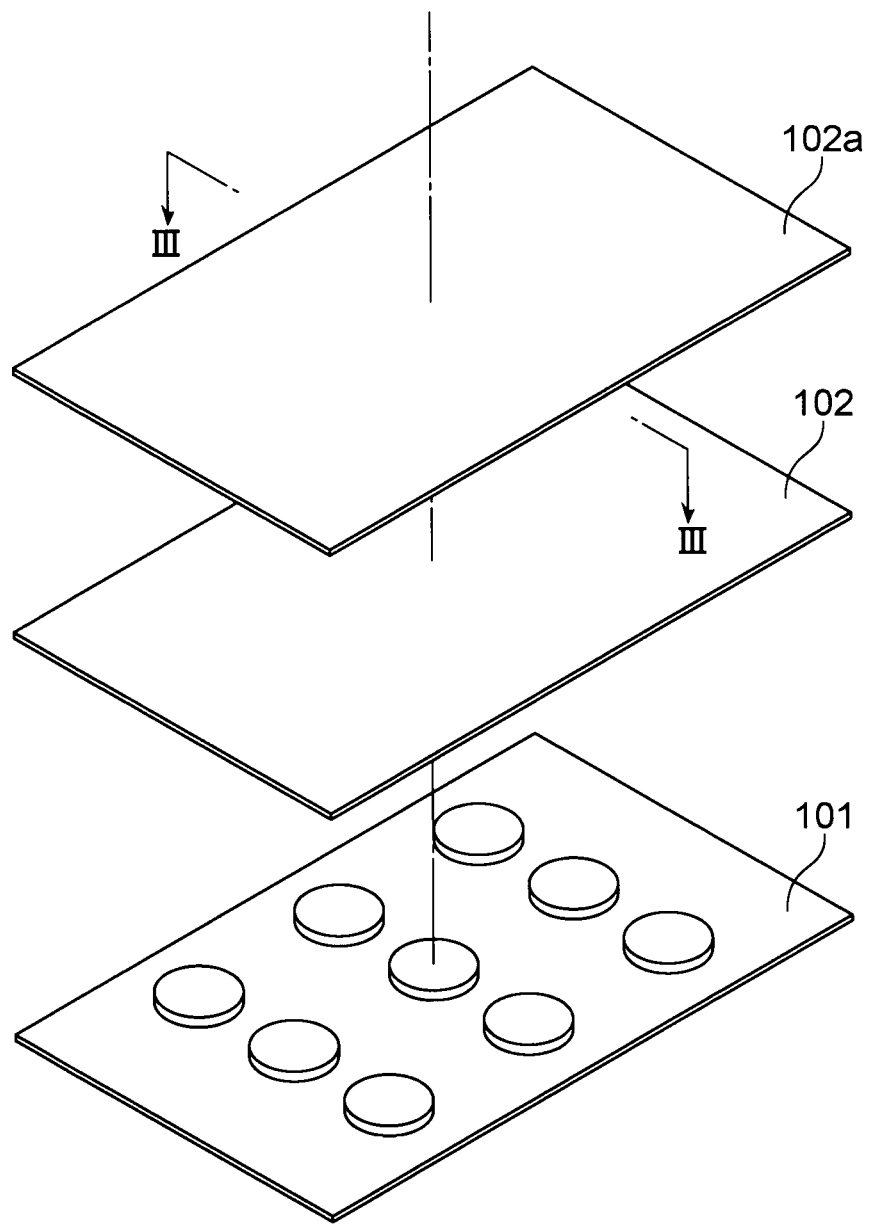
FIG. 2 is a schematic view of the disposition of a hardware button input acceptance section 101 and an electrostatic pad input acceptance section 102.

Thereafter, the disposition of the hardware button input acceptance section 101 and the electrostatic pad input acceptance section 102 will be described by using FIG. 2. FIG. 2 is a schematic view of the disposition of the hardware button input acceptance section 101 and the electrostatic pad input acceptance section 102. As shown in FIG. 2, a transparent protective sheet 102a formed by an elastic member is disposed above the electrostatic pad input acceptance section 102. Furthermore, the hardware button input acceptance section 101 is disposed below the electrostatic pad input acceptance section 102.

The protective sheet 102a and the electrostatic pad input acceptance section 102 are constituted by transparent members and the user is therefore able to visually check the characters (numerical characters) which are printed on each key top of the hardware button input acceptance section 101 disposed below the protective sheet 102a and the electrostatic pad input acceptance section 102. Further, as mentioned hereinabove, in a case where the electrostatic pad input acceptance section 102 and protective sheet 102a are constituted by elastic members and the user presses one point of the protective sheet 102a and the electrostatic pad input acceptance section 102, the pressing force is transmitted to the hardware button input acceptance section 101 disposed below the protective sheet 102a and the electrostatic pad input acceptance section 102. The hardware button input acceptance section 101 is then capable of accepting inputs via the electrostatic pad input acceptance section 102.

A specific example of the above will be described by using FIG. 3. FIG. 3 is a cross-sectional view in the direction of the arrow III-III in the schematic constitutional view of FIG. 2. As shown in (a) of FIG. 3, the protective sheet 102a, the electrostatic pad input acceptance section 102, and the hardware button input acceptance section 101 are disposed in that order starting from the top. When the pressing processing is performed by the user, the user is able to press one button of the hardware button input acceptance section 101 which is disposed in the lowest layer with his finger by utilizing the elasticity of the protective sheet 102a and the electrostatic pad input acceptance section 102, as shown in (b) of FIG. 3.

Figure 4:
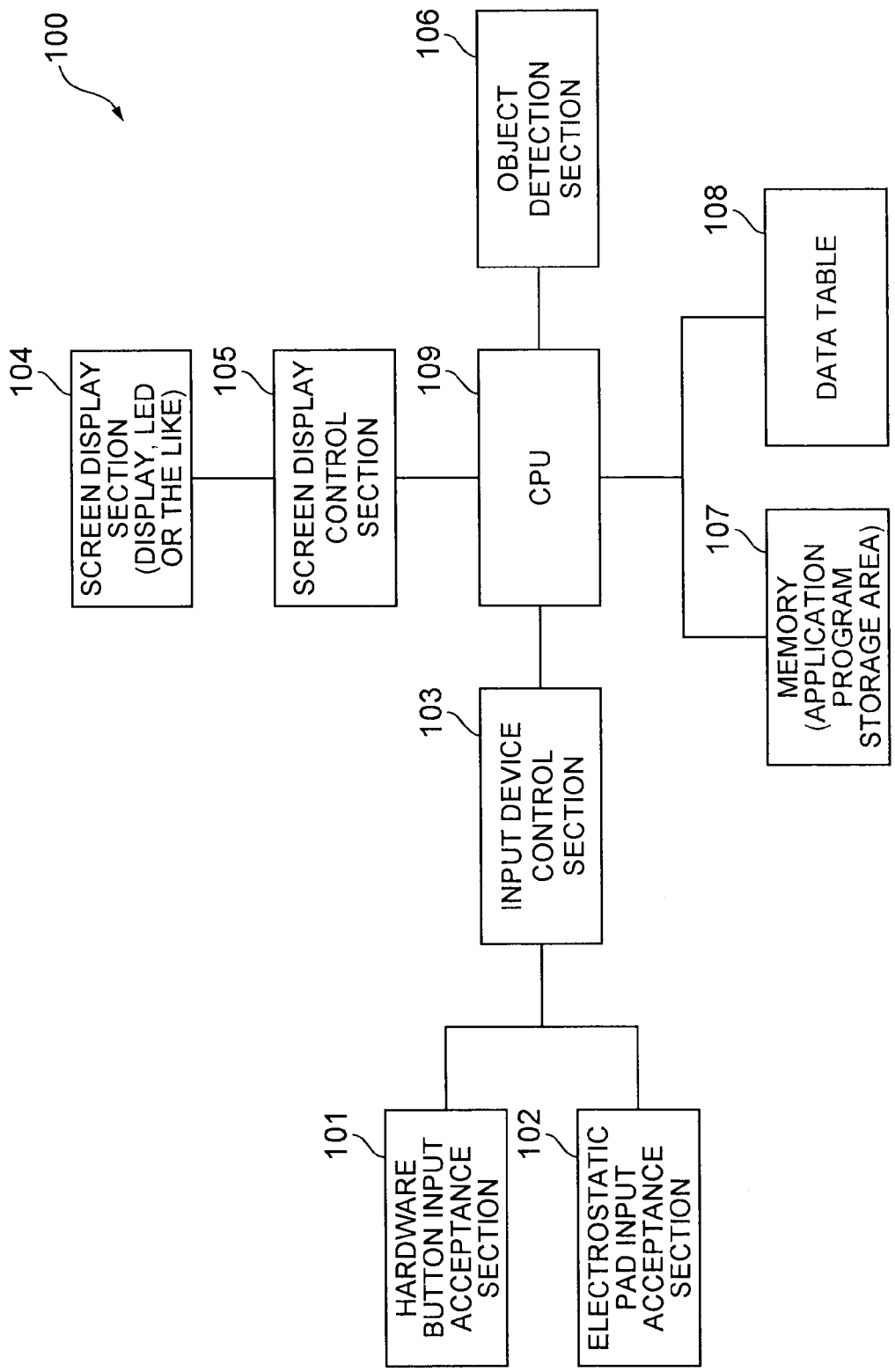
FIG. 4 is a block diagram showing the constitution of the cellular phone 100 of this embodiment.

The functions of the cellular phone 100 thus constituted will be described next. FIG. 4 is a block diagram showing the constitution of the cellular phone 100 of this embodiment. As shown in FIG. 4, the cellular phone 100 is constituted comprising the hardware button input acceptance section 101, the electrostatic pad input acceptance section 102, an input device control section 103, the screen display section 104, a screen display control section 105, an object detection section 106, a memory 107, the data table 108, and a CPU 109. The respective constitutions of the aforementioned parts will be described hereinbelow.

The hardware button input acceptance section 101 is an operating button which is constituted by hardware. For example, the hardware button input acceptance section 101 is constituted by key tops and dome switches which are disposed below the key tops and the hardware button input acceptance section 101 is constituted such that the hardware button input acceptance section 101 is capable of passing an electrical current as a result of contact between an operating contact and a fixed contact, which are formed in the dome switches, when a key top is pressed by the user.

The electrostatic pad input acceptance section 102 is an input member which detects the position of the user's finger or the like which is touching the pad by using the coordinates X and Y to specify the position of the user's finger. The electrostatic pad input acceptance section 102 is able to detect the touched position and, in cases where the user touches the pad by tracing his finger over the pad, is able to detect the track which the user traces. The electrostatic pad input acceptance section 102 is able to detect the position of the user's finger even via the protective sheet 102a.

The input device control section 103 is a part which outputs an input instruction that is accepted by the hardware button input acceptance section 101 or the electrostatic pad input acceptance section 102 to the CPU 109. In other words, the CPU 109 judges whether input acceptance is placed in an ON state in accordance with setting information which is described in the data table 108. Furthermore, the result of the judgment by the CPU 109 is input to the input device control section 103 and settings are made such that either input acceptance section is shifted to an ON state by the input device control section 103. The input device control section 103 performs switching processing on the basis of this set state.

The screen display section 104 is a part which displays information to the user and is constituted by a display or LED, for example.

The object detection section 106 is a part which detects a predetermined object and is formed on the screen which has undergone display processing under the control of an application which is running. This object detection section 106 is, for example, a part which detects that the pointer operated by means of the electrostatic pad input acceptance section 102 is a character input part in cases where an object representing a character input part is shown.

The memory 107 is a part which has an area for storing an application program.

The data table 108 is a part which stores conditions for switching between the hardware button input acceptance section 101 and the electrostatic pad input acceptance section 102 and is a part which associates and stores the name of the application currently running with setting information which represents the ON and OFF states of the electrostatic pad input acceptance section 102, for example. A specific example of the data table 108 will be described by using the drawings. FIG. 5 is an explanatory diagram of the data table 108 of this embodiment. As shown in FIG. 5, the name of the application running and the setting information which indicates the ON and OFF of the electrostatic pad input acceptance section 102 are associated and stored in the data table 108. In the example of FIG. 5, settings are such that an ON state is established in order to be able to accept inputs of the electrostatic pad input acceptance section 102 in cases where a full browser is running and settings are such that an OFF state is established in order to be able to accept inputs of the electrostatic pad input acceptance section 102 in cases where a character inputting-based application such as a notebook application is running.

The CPU 109 is a part which performs overall parts control, from the hardware button input acceptance section 101 to the data table 108.

Figure 6:
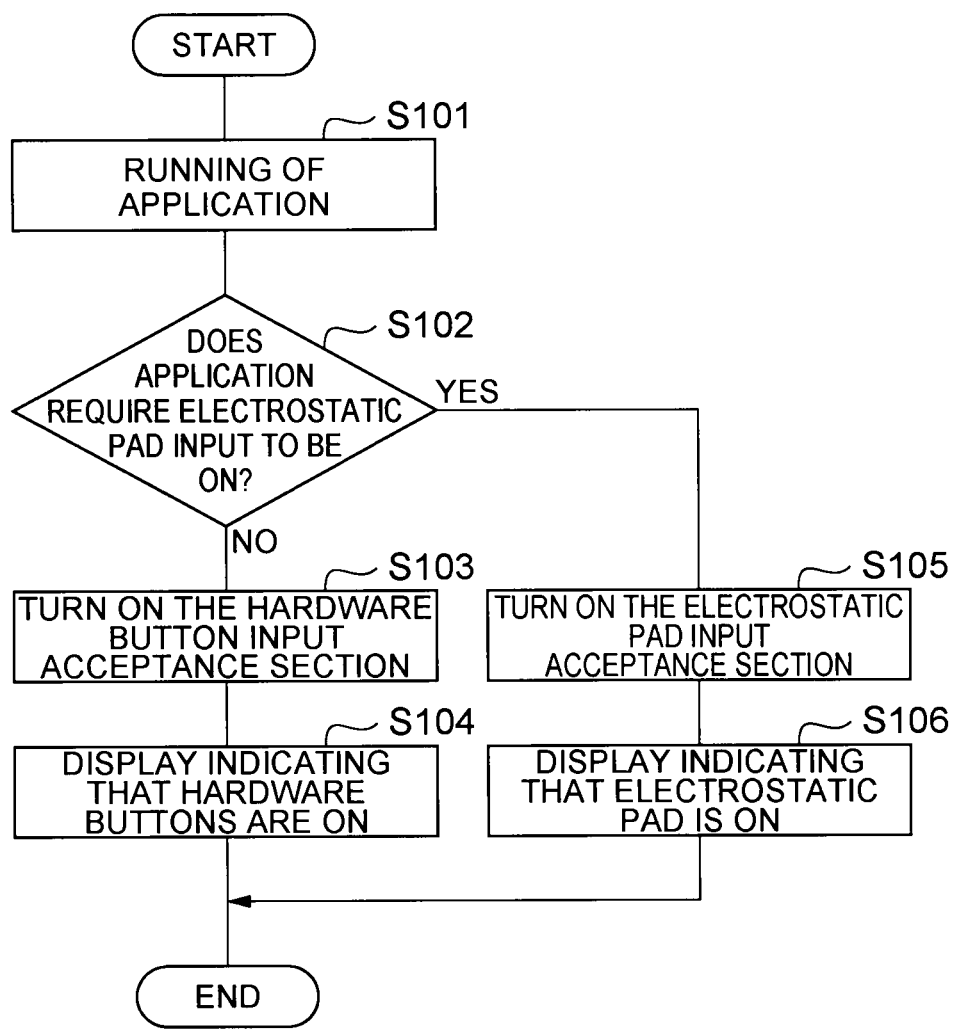
FIG. 6 is a flowchart showing the operation of the cellular phone 100.

The operation of the cellular phone 100 which is constituted in this way will be described next. FIG. 6 is a flowchart showing the operation of the cellular phone 100. First, the application is read from the memory 107 and run by means of a user operation (S101). As initial settings prior to running the application, settings are preferably made such that the electrostatic pad input acceptance section 102 is turned OFF and the hardware button input acceptance section 101 is turned ON (is prioritized).

When the application is run, the data table 108 is referenced by the CPU 109 and it is judged by the CPU 109 whether the application requires inputs of the electrostatic pad input acceptance section 102, that is, whether settings to turn ON the electrostatic pad input acceptance section 102 have been made with respect to the application (S102). Here, in cases where settings have been made and it is judged by the CPU 109 that the application requires inputs of the electrostatic pad input acceptance section 102, control to turn ON the inputs for the electrostatic pad input acceptance section 102 is performed with respect to the input device control section 103 (S105). The fact that the electrostatic pad input acceptance section 102 is ON is displayed on the screen display section 104 (S106).

Furthermore, in cases where it is judged by the CPU 109 that an application which does not turn ON the electrostatic pad is running (S102: NO), the control to turn ON input acceptance by the hardware button input acceptance section 101 is performed with respect to the input device control section 103 (S103). Furthermore, the fact that the hardware button input acceptance section 101 is ON is displayed on the screen display section 104 (S104). In cases where the hardware button input acceptance section 101 is ON in an initial state, the processing of steps S103 and S104 can be omitted.

Thus, settings to automatically turn ON either of the input acceptance sections can be made by the application which is running.

Figure 7:
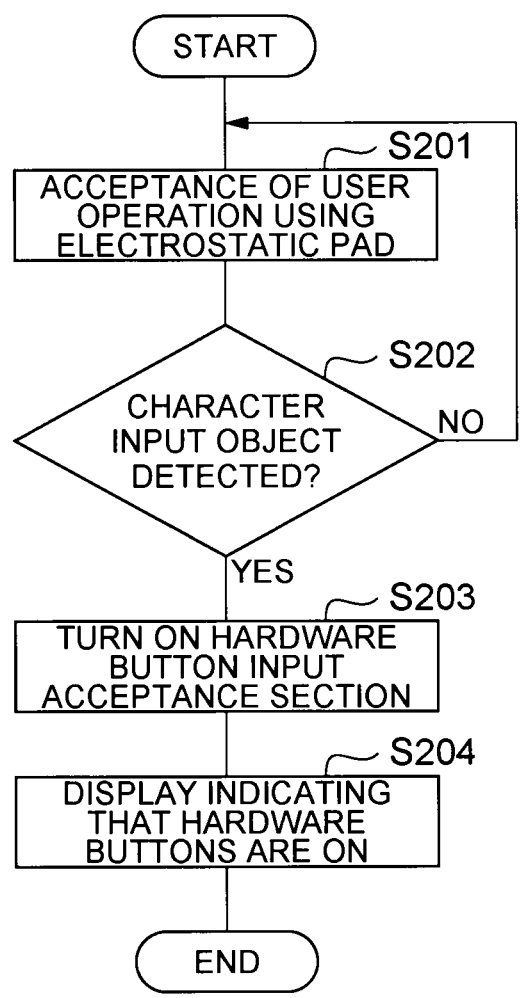
FIG. 7 is a flowchart showing the processing when the hardware button input acceptance section 101 is shifted to an ON state.

Subsequently, processing for a case where a shift is made to the hardware button input acceptance section 101 when the application is being operated in cases where the electrostatic pad input acceptance section 102 is ON will be described. FIG. 7 is a flowchart showing the processing when the hardware button input acceptance section 101 is shifted to an ON state when the application is being operated.

First, operation of the electrostatic pad input acceptance section 102 by the user is accepted (S201). Here, an operation such as one where the pointer is moved by the user moving his finger over the electrostatic pad, for example, is accepted. It is then judged whether a character input object has been detected by the object detection section 106 (S202). For example, this character input object is a text box for accepting a character input. The detection of a character input object is preferably performed by means of this operation by judging whether a character input object has been detected for a predetermined time.

When a character input object is detected (S202: YES), an instruction is issued to the input device control section 103 by the CPU 109 to place the hardware button input acceptance section 101 in an ON state (S203). A display to indicate that the hardware button input acceptance section 101 is in an ON state is then displayed on the screen display section 104 by the CPU 109 (S204). When checking that the hardware button input acceptance section 101 is in an ON state, the user is able to input characters or the like by pressing the hardware button input acceptance section 101 from above the electrostatic pad input acceptance section 102.

Thus, upon detection of a predetermined object when the electrostatic pad input acceptance section 102 is being operated, the hardware button input acceptance section 101 is automatically controlled to enter an ON state and input acceptance which corresponds to this state can be performed. For example, because the operability of inputting characters by means of the hardware button input acceptance section 101 is considered to be favorable in cases where character inputting is carried out, the hardware button input acceptance section 101 is automatically placed in an ON state.

Figure 8:
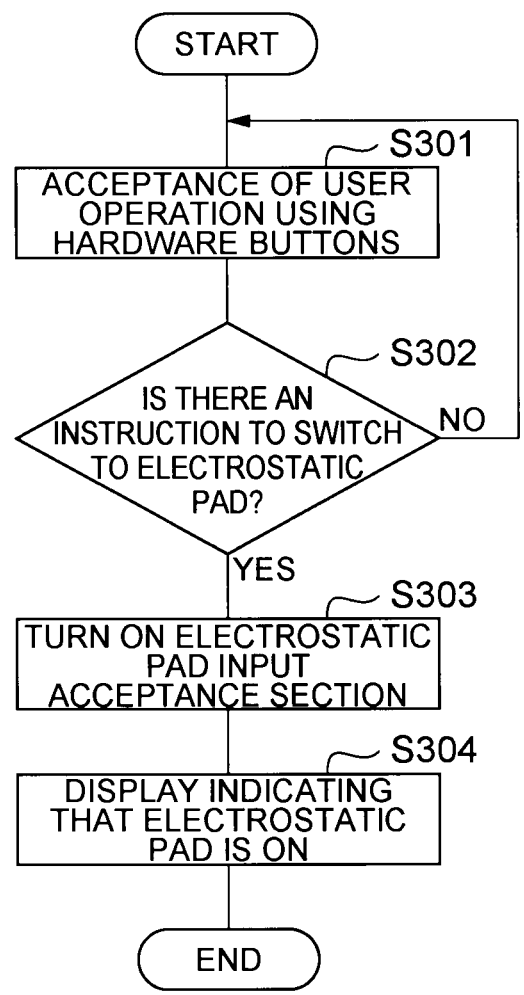
FIG. 8 is a flowchart showing the processing when the electrostatic pad input acceptance section 102 is shifted to an ON state.

Subsequently, processing in a case where the hardware button input acceptance section 101 is ON and a shift is made to the electrostatic pad input acceptance section 102 when the application is being operated will be described. FIG. 8 is a flowchart showing the processing when the electrostatic pad input acceptance section 102 is shifted to an ON state when the application is being operated.

First, the operation of the hardware button input acceptance section 101 by the user is accepted (S301). It is then judged by the CPU 109 whether there is an instruction to switch to the electrostatic pad (S302). Here, in cases where it is judged that there is a switching instruction, the input device control unit 103 is controlled to place the electrostatic pad input acceptance section 102 in an ON state (S303). The fact that the electrostatic pad input acceptance section 102 is in an ON state is then displayed on the screen display section 104 (S304).

It is thus possible to shift the ON state from the electrostatic pad input acceptance section 102 to the hardware button input acceptance section 101.

Figure 9:
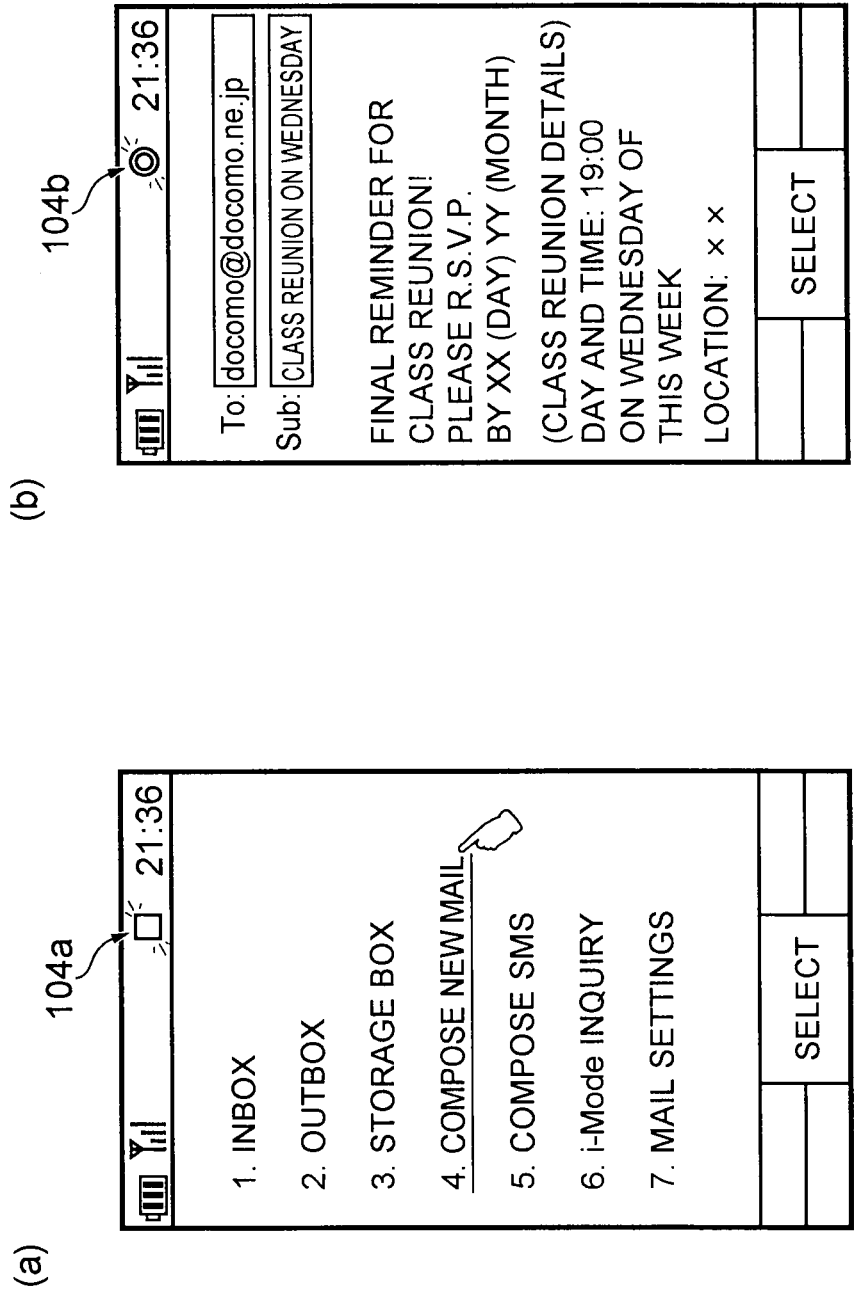
FIG. 9 is an explanatory diagram showing a screen transition when shifting from a menu screen of a mail application to a new mail creation screen.

A specific example of when the ON state is shifted from the electrostatic pad input acceptance section 102 to the hardware button input acceptance section 101 will be described next. FIG. 9 is an explanatory diagram showing a screen transition when shifting from a menu screen of a mail application to a new mail creation screen.

As shown in (a) of FIG. 9, a mail menu screen is displayed on the screen display section 104. In this case, the data table 108 is set so that the electrostatic pad input acceptance section 102 is in an ON state when a mail application is running. The user is then able to make any selection from "1. Inbox" to "7. Mail settings" by operating the pointer on the screen display. In (a) of FIG. 9, the screen display section 104 displays a mark 104a which indicates that the electrostatic pad input acceptance section 102 is in an ON state. The user is able to easily grasp whether input acceptance is in an ON state by visually checking this mark.

Further, in cases where the object detection section 106 is able to detect each item from "1. Inbox" to "7. Mail settings" as an object and has been able to detect any of these items, the hardware button input acceptance section 101 enters an ON state and the user is able to shift to the new mail creation screen shown in (b) of FIG. 9 by pressing the hardware buttons via the electrostatic pad input acceptance section 102 in this state. In the example of (b) of FIG. 9, the mark 104b is displayed, which indicates here that the hardware button input acceptance section 101 is in an ON state.

Figure 10:
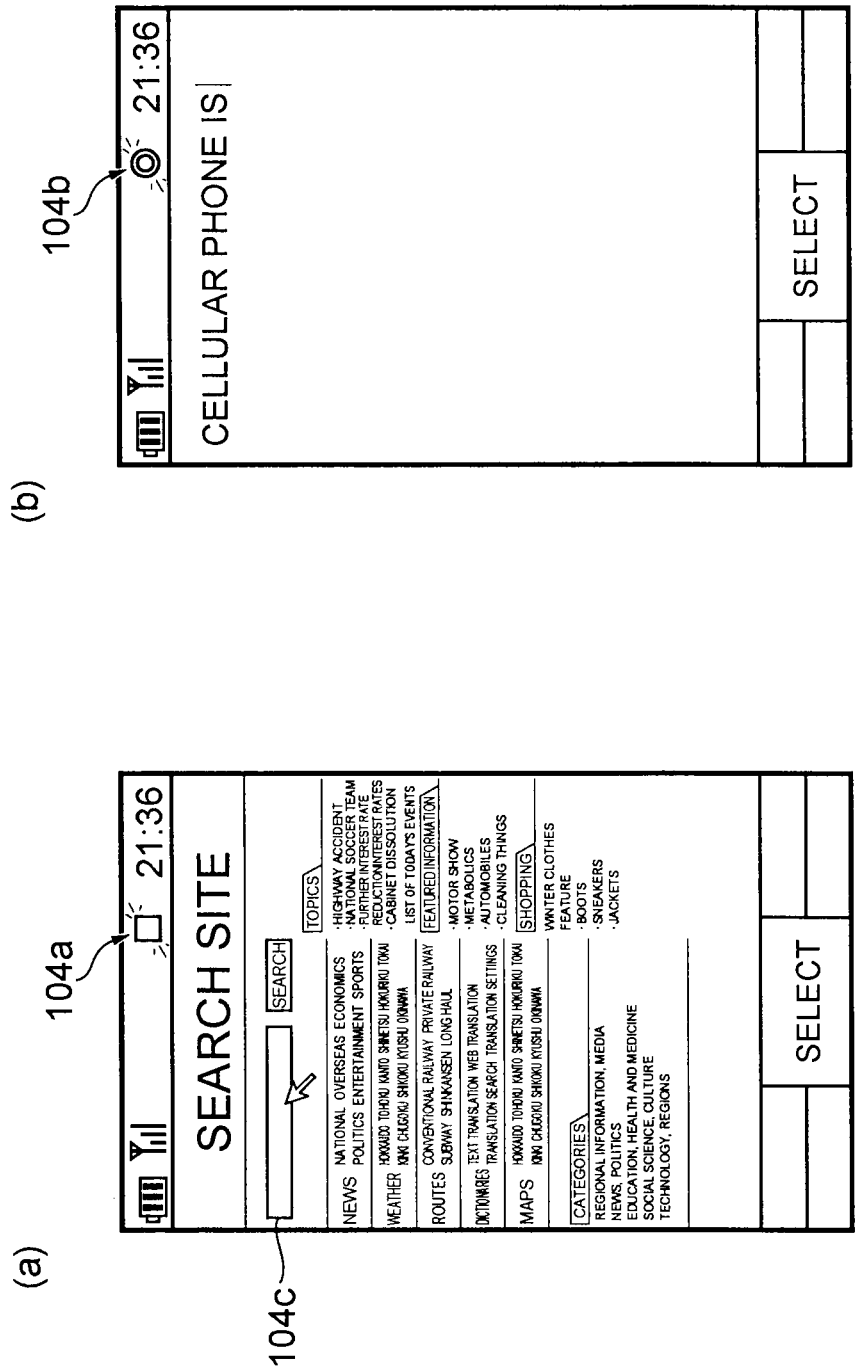
FIG. 10 is an explanatory diagram showing a screen transition when shifting from a top menu screen of a search site to a text box input screen.

Similarly, FIG. 10 is an explanatory diagram showing a screen transition when shifting from a top menu screen of a search site to a text box input screen.

As shown in (a) of FIG. 10, the top menu screen of the search site is displayed on the screen display section 104. In this case, the data table 108 is set so that the electrostatic pad input acceptance section 102 enters an ON state when a mail application is running. The user then operates the pointer on the screen display and shifts the pointer onto a text box 104c. Upon detecting that the pointer has moved onto the text box 104c, the object detection section 106 shifts the screen to a character input screen for inputting search characters as shown in (b) of FIG. 10. Marks 104a and 104b are displayed in (a) of FIG. 10 and (b) of FIG. 10 as per (a) of FIG. 9 and (b) of FIG. 9 and the display screen is constituted such that same can be visually checked by the user.

It is thus possible to provide a cellular phone of favorable operability by automatically detecting an object and switching between placing the hardware button input acceptance section 101 in an ON state and placing the electrostatic pad input acceptance section 102 in an ON state in accordance with the object.

Figure 11:
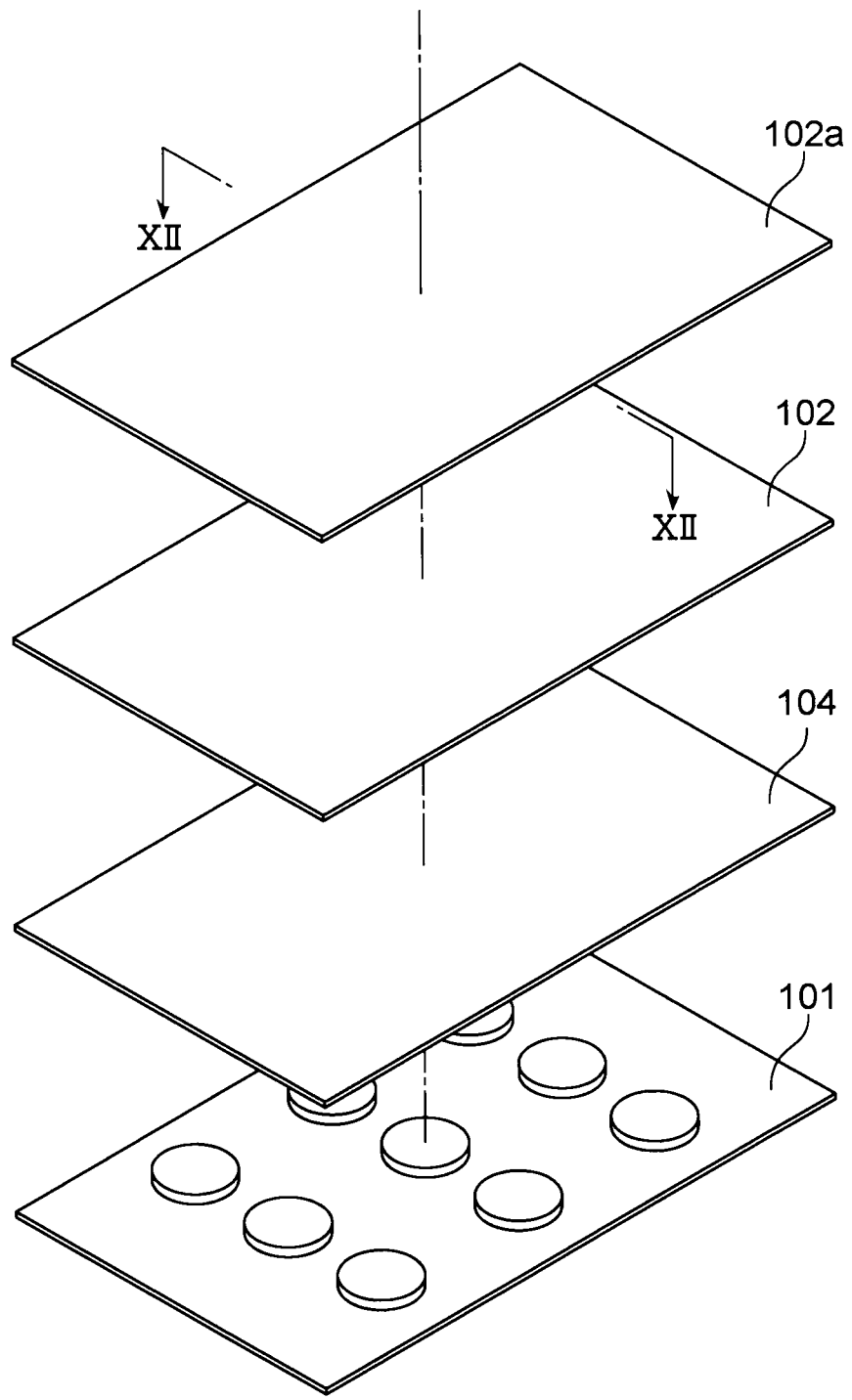
FIG. 11 is a schematic view of the disposition of the hardware button input acceptance section 101, the electrostatic pad input acceptance section 102, and a screen display section 104, which are in the cellular phone 100 of a modified example of this embodiment.

A modified example of this embodiment will be described next. FIG. 11 is a schematic view of the disposition of the hardware button input acceptance section 101, the electrostatic pad input acceptance section 102, and the screen display section 104, which are in the cellular phone 100 of the modified example of this embodiment.

As shown in FIG. 11, in the modified example, the electrostatic pad input acceptance section 102 is disposed under the protective sheet 102a, the screen display section 104 which is a display or the like is disposed under the electrostatic pad input acceptance section 102, and the hardware button input acceptance section 101 is disposed under the screen display section 104. The protective sheet 102a and the electrostatic pad input acceptance section 102 are formed by transparent members and the information displayed by the screen display section 104 can therefore be visually checked by the user. Further, the screen display section 104 is constituted by electronic paper, for example. That is, the screen display section 104 is a permeable member or a transparent member and the user is therefore able to recognize the buttons of the hardware button input acceptance section 101 which is disposed below the screen display section 104 and is able to perform an input operation with respect to the hardware button input acceptance section 101.

FIG. 12 shows a cross-sectional view in the direction of the arrow XII-XII of the cellular phone 100 of this modified example. As shown in (a) of FIG. 12, the protective sheet 102a, the electrostatic pad input acceptance section 102, the screen display section 104, and the hardware button input acceptance section 101 are disposed in that order. As shown in (b) of FIG. 12, when the user presses one button of the hardware button input acceptance section 101 with his finger, the protective sheet 102a, the electrostatic pad input acceptance section 101, and the screen display section 104 bend due to their elasticity and this one button thus comes to be pressed.

Accordingly, the space where the screen display section 104 is disposed can be omitted, the device can be miniaturized, and the amount of information that can be displayed can be increased even for a device of the same size.

The operating effect of the cellular phone 100 of this embodiment will be described next. In this cellular phone 100, the CPU 109 is able to judge the application which is to be the user operation target and the input device control section 103 is able to judge and switch between accepting inputs from the electrostatic pad input acceptance section 102 and accepting inputs from the hardware button input acceptance section 101 in accordance with the application thus judged.

Accordingly, in the case of a device such as a cellular phone, for example, in which the hardware button input acceptance section 101 and the electrostatic pad input acceptance section 102 are disposed to be stacked, it is possible to provide a user-friendly device which is capable of suitably and automatically switching between the hardware button input acceptance section 101 and the electrostatic pad input acceptance section 102 depending on the usage state thereof, without the user making a manual selection between operating the hardware button input acceptance section 101 and the electrostatic pad input acceptance section 102.

In the cellular phone 100, the object detection section 106 detects that a pointer, which is operated by means of the electrostatic pad input acceptance section 102, is pointing to a predetermined object among objects which are displayed on the operation screen displayed by the screen display section 104 and, in cases where the predetermined object is detected, the CPU 109 is able to switch between placing the electrostatic pad input acceptance section 102 in an OFF state and placing the hardware button input acceptance section 101 in an ON state. Accordingly, the input device control section 103 is capable of switching the input from the electrostatic pad input acceptance section 102 to the hardware button input acceptance section 101 depending on the object, whereby a user-friendly device can be provided.

In the cellular phone 100, the screen display section 104 produces a display indicating whether the electrostatic pad input acceptance section 102 or the hardware button input acceptance section 101 is in an ON state, whereby the user is easily able to ascertain whether he may use either the electrostatic pad input acceptance section 102 or the hardware button input acceptance section 101.

The device constitution of the cellular phone 100 can be reduced by disposing the screen display section 104 stacked between the electrostatic pad input acceptance section 102 and the hardware button input acceptance section 101, which are constituted by transparent members.

What is claimed is:

1. An information processing device, comprising:
an electrostatic pad which accepts input from a user;
hardware buttons which are disposed to be stacked below the electrostatic pad and accept input from the user;
judgment means for judging an application which constitutes a user operation target;
switching means for switching between accepting input from the electrostatic pad and accepting input from the hardware buttons, depending on the application judged by the judgment means, wherein the hardware buttons and the electrostatic pad are separate and independent input devices each of which has an ON state and an OFF state, the ON state being a state in which inputs are accepted and the OFF state being a state in which inputs are not accepted, and the information processing device is configured to provide at least a mode in which the electrostatic pad is in the OFF state while the hardware buttons are in the ON state;

display means for displaying an operation screen on which a pointer can be operated by means of the input accepted by the electrostatic pad; and detection means for detecting that the pointer, which is operated by means of the electrostatic pad, has moved onto a text box for accepting a character input which is displayed on the operation screen displayed by the display means, wherein when the detection means detects that the pointer has moved onto the text box, the switching means switches the electrostatic pad to the OFF state and switches the hardware buttons to the ON state.

2. The information processing device according to claim 1, wherein the display means produces a display indicating whether the electrostatic pad or the hardware buttons are in the ON state.

3. The information processing device according to claim 1, wherein the electrostatic pad and the hardware buttons are constituted by transparent members, and the display means is disposed to be stacked between the electrostatic pad and the hardware buttons.

4. The information processing device according to claim 1, wherein the electrostatic pad and the hardware buttons are operable from a same surface of the information processing device.

5. An information processing device, comprising:

an electrostatic pad which accepts input from a user;

hardware buttons which are disposed to be stacked below the electrostatic pad and accept input from the user;

a judgment unit that judges an application which constitutes a user operation target;

a switching unit that switches between accepting input from the electrostatic pad and accepting input from the hardware buttons, depending on the application judged by the judgment unit, wherein the hardware buttons and the electrostatic pad are separate and independent input devices each of which has an ON state and an OFF state, the ON state being a state in which inputs are accepted and the OFF state being a state in which inputs are not accepted, and the information processing device is configured to provide at least a mode in which the electrostatic pad is in the OFF state while the hardware buttons are in the ON state;

a display unit that displays an operation screen on which a pointer can be operated by the input accepted by the electrostatic pad; and a detection unit that detects that the pointer, which is operated by the electrostatic pad, has moved onto a text box for accepting a character input which is displayed on the operation screen displayed by the display unit, wherein when the detection unit detects that the pointer has moved onto the text box, the switching unit switches the electrostatic pad to the OFF state and switches the hardware buttons to the ON state.

* * * * *